Feb. 6, 1940.  F. J. CLIPSTON  2,189,706
AUTOMATIC SIDE HILL EQUALIZER ATTACHMENT FOR GRAIN COMBINES
Filed Oct. 12, 1938  2 Sheets-Sheet 1
Fig. 1.
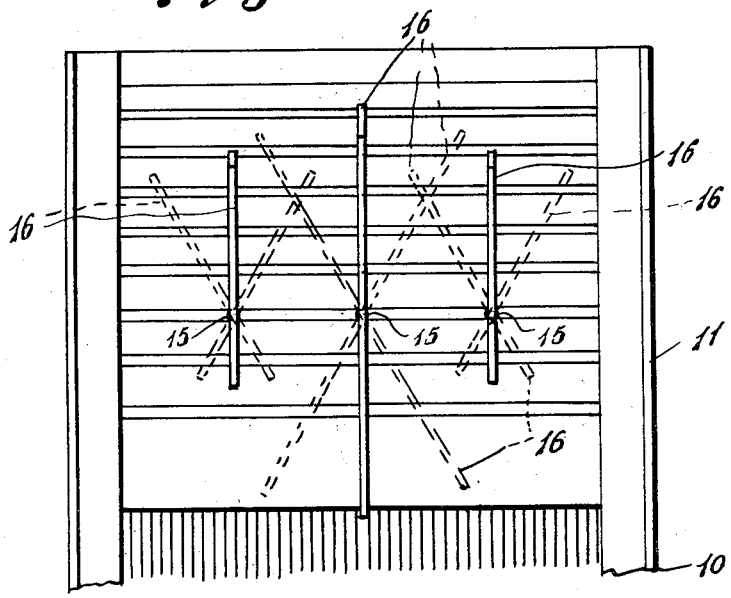
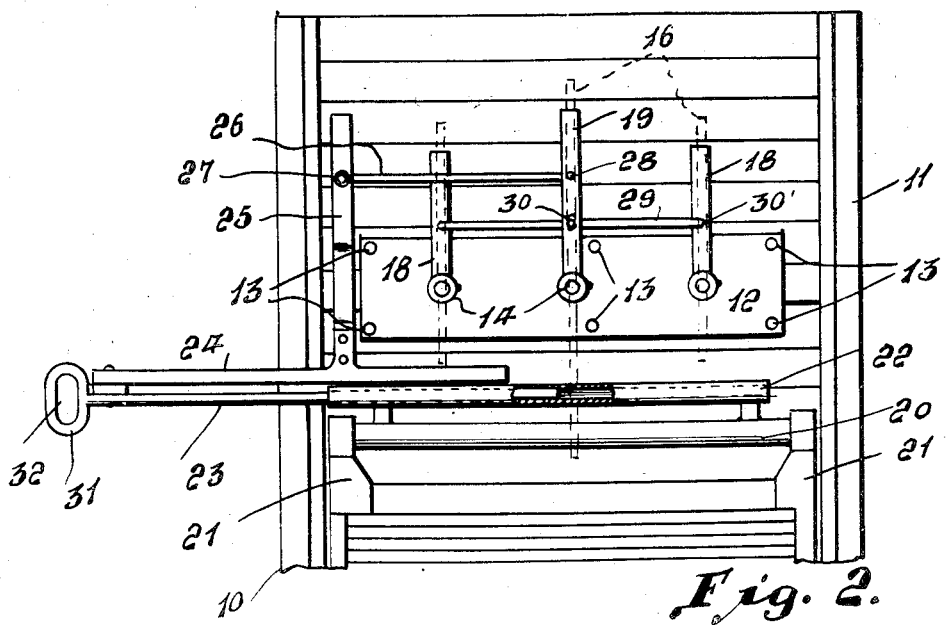
Fig. 2.
Inventor
Frank J. Clipston

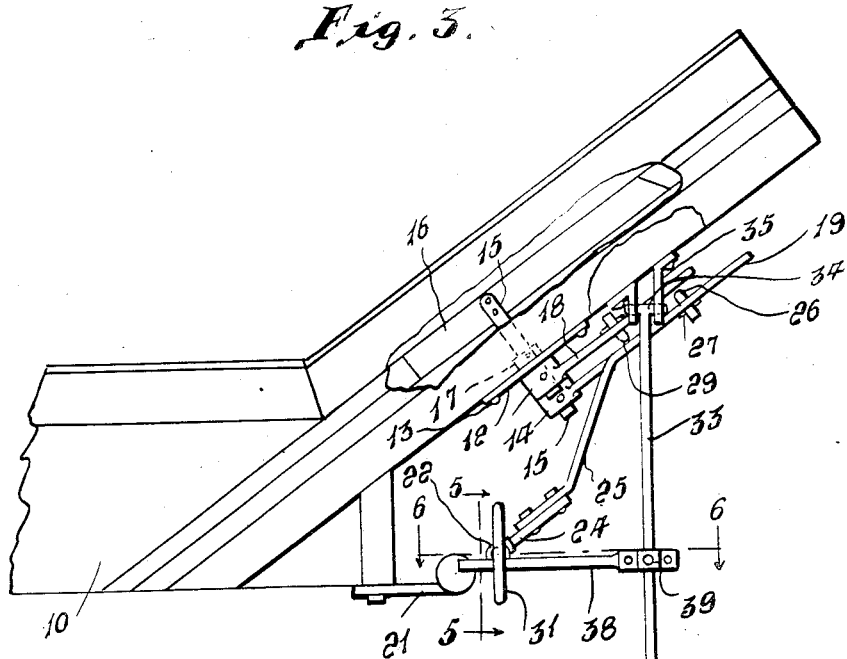
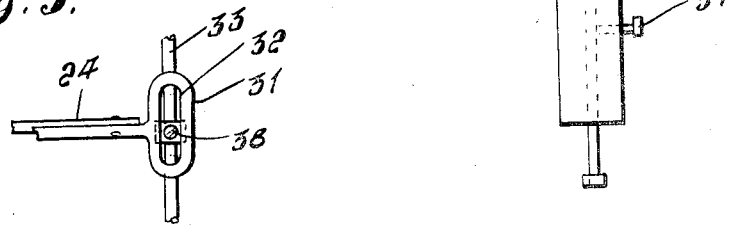
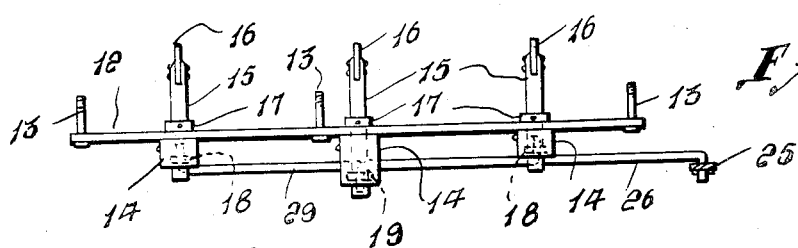
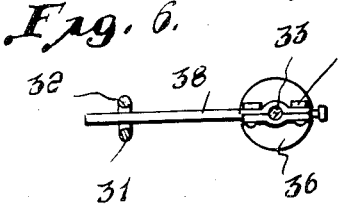

Patented Feb. 6, 1940

2,189,706

UNITED STATES PATENT OFFICE 2,189,706

AUTOMATIC SIDE HILL EQUALIZER ATTACHMENT FOR GRAIN COMBINES

Frank J. Clipston, Farragut, Iowa, assignor of one-half to Sigurd Enemark and June Clipston Enemark, both of Omaha, Nebr.

Application October 12, 1938, Serial No. 234,679

3 Claims. (Cl. 130—24)

This invention relates to a means or attachment for a grain combine and it aims to provide a novel mechanism which will distribute the chaff and grain onto the sieve and shoe when the combine or machine is tilted transversely or laterally. The invention equalizes the amount of grain and chaff fed onto the sieves whether or not the combine is transversely in or out of the horizontal.

It is particularly an object to provide such a mechanism as will save practically all of the grain and clean it in a superior manner than heretofore.

The more specific objects and advantages will become apparent from a consideration of the description following taken in connection with accompanying drawings illustrating an operative embodiment.

In said drawings:

Figure 1 is a view showing a grain pan of a combine, in plan, with my improvements attached;

Figure 2 is an inverted plan view of the parts of Figure 1;

Figure 3 is a side elevation of a portion of the combine having my improvements attached;

Figure 4 is a plan view of the main parts constituting the invention;

Figure 5 is a sectional view taken on the line 5—5 of Figure 3, and

Figure 6 is a sectional view taken on the line 6—6 of Figure 3.

Referring specifically to the drawings, a conventional grain combine is suggested fragmentarily at 10 having an inclined grain pan at 11. To the under surface of the combine at the grain pan, a mounting plate or base 12 is fastened as at 13. Such plate has bearings 14 in which shafts 15 are journaled and which shafts at their inner ends carry distributing blades 16 of any suitable shape and size which operate over the grain pan to distribute the received grain and chaff, the same moving to the extremes of movement shown in dotted lines in Figure 1. Collars 17 on the shafts 15 abut the inner surface of the plate 12 and from such shafts adjacent the free ends of the bearings 14, are cranks 18, and 19, the latter being central.

A fixed slide bearing or guide 20 is fastened as by brackets 21 to the machine 10 and it has a tubular portion 22 provided with open ends. Slidable in the tubular portion 22 is an equalizer rod 23 having a bar 24 fastened thereto from which a branch 25 extends. Branch 25 has a rod or pitman 26 pivoted thereto at 27 and to the crank 19 at 28. Another rod or link 29 is connected by a slot at 30 to the crank 19 and pivoted at its terminals as at 30 to the cranks 18.

Said equalizer rod 23 has an enlargement 31 providing an elongated slot 32. A rod 33 is pivotally suspended by a T-shaped head 34 from brackets 35 fastened to a suitable part of the frame 10 and adjacent the lower end, such rod 33 mounts a suitable weight 36 which is adjustable therealong by reason of the provision of a set screw 37. Rigidly and adjustably fastened to the rod 33 is a projection or arm 38, a clamp 39 being used for the connection. Such arm 38 passes through the opening 32.

As a result of the construction described, when the combine or machine 10 is transversely or laterally level, blades 16 extend longitudinally of the grain pan and vehicle. However, when the combine tilts laterally or out of the horizontal in a transverse direction, the parts 23, 24 and 25, will be slid laterally or transversely since the rod 33 seeks the vertical and remains therein, such sliding movement of the aforesaid parts through the medium of the rods 26 and 29, serving to move the blades 16 to either inclined position shown, according to the direction of tilting laterally of the combine. I have found in practice that the blades serve to distribute the chaff and grain onto the sieve and shoe in an equalized manner.

Various changes may be resorted to provided they fall within the spirit and scope of the invention.

I claim as my invention:

1. Apparatus of the class described comprising an attaching plate having bearings, shafts journaled in the bearings, distributor blades carried by the shafts on one side of the plate, cranks extending from the shafts on the other side of the plate, a mounting member, slidable means mounted by said mounting member, an arm extending from the slidable means, connections from the arm to the cranks, said slidable means having a slot, and weighted means controlled by the level of a vehicle to which it is attached, the last mentioned means extending through said slot.

2. In combination with a vehicle having a transverse inclined grain pan, and attaching plate, shafts journaled thereon, distributing blades carried by the shafts on one side of the plate and operable over and relatively close to the pan for contact with material traversing the pan, cranks extending from the shafts on the other side of the plate, laterally movable sliding means, connections from the latter to control operation of the cranks, and a weighted device controlling operation of the last mentioned means, said weighted device being controlled by the level of the vehicle.

3. In combination with a vehicle having a transverse inclined grain pan, and attaching plate, a shaft journaled in the attaching plate, a distributor blade carried by the shaft on one side of the plate and operable over and relatively close to the pan for contact with material traversing the pan, a crank extending from the shaft on the other side of the plate, a mounting member, movable means mounted by said mounting member, an arm extending from the movable means, a connection from the arm to the crank, and weighted means controlled by the level of the vehicle to which it is attached, the last mentioned means being inter-connected with said movable means.

FRANK J. CLIPSTON.